(No Model.)
T. A. EDISON.
ART OF ELECTROLYTIC DECOMPOSITION.
No. 466,460. Patented Jan. 5, 1892.
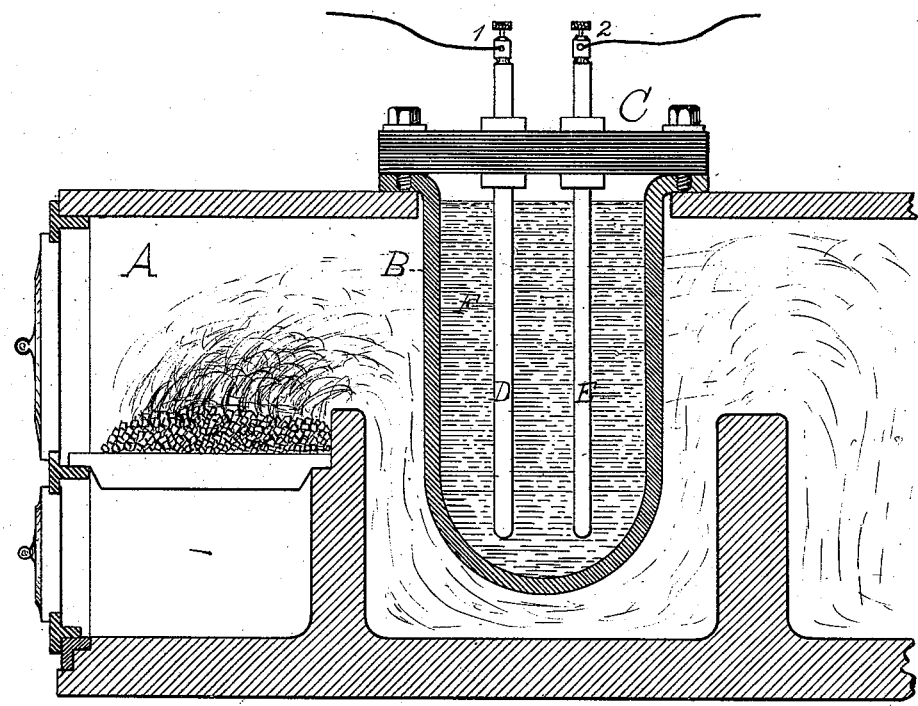
WITNESSES:
E. C. Rowland
C. P. Mott
INVENTOR:
Thomas A Edison,
BY Rich. N. Dyer,
ATTORNEY.

United States Patent Office.

THOMAS A. EDISON, OF MENLO PARK, NEW JERSEY.

ART OF ELECTROLYTIC DECOMPOSITION.

SPECIFICATION forming part of Letters Patent No. 466,460, dated January 5, 1892.

Application filed May 26, 1882. Serial No. 62,576. (No model.)

*To all whom it may concern:*

Be it known that I, THOMAS A. EDISON, of Menlo Park, in the county of Middlesex and State of New Jersey, have invented a new and useful Improvement in the Art of Electrolytic Decomposition, (Case No. 418,) of which the following is a specification.

The object of this invention is to effect the economical decomposition of various substances electrolytically, and more particularly those substances which do not conduct electricity at all at ordinary temperatures or below the boiling-point. This is accomplished by subjecting the substances to the action of an electric current when under high temperature and pressure.

In carrying out the invention the substance is inclosed in a vessel capable of withstanding high pressure. This vessel may be of iron or nickel or of either, lined with fire-clay or made or lined with other material suitable for the purpose. The electrodes, which may be of metal or carbon, are supported from a cover of insulating material, or one of them may be so supported and the other be formed by the vessel itself. This cover may be made of many layers of mica and be secured to the top of the vessel by bolts or otherwise, such cover closing the vessel air-tight. The electrodes have circuit connections. A suitable furnace is provided, which is adapted to receive one or a number of these vessels. The temperature being raised, the substance to be decomposed is vaporized. The escape of the vapor being prevented, a high pressure is obtained within the vessel, and the heat of the substance can be increased accordingly. When the proper high heat and pressure have been obtained, an electric current is passed through the substance and the electrical decomposition takes place.

Heat tends to diminish the amount of electric energy required to effect the decomposition, and as this heat is obtained directly from the combustion of fuel acting on the substance the process requires but a small amount of electric energy, and this amount is still further diminished by the fact that nearly all compounds are reduced in resistance by heat. Since the substances designed to be treated cannot be decomposed at all electrolytically at a temperature at or below the boiling-point, or not so economically as at a higher temperature, it is an essential feature of the invention that pressure should be employed, so that the requisite high temperature for economical decomposition may be reached.

As an illustration of a specific use of the process I will state that it is highly useful for the production of the metal aluminium from its chloride. The chloride of aluminium being a salt which volatilizes below the temperature at which it can be successfully decomposed electrolytically, the process permits of the increase in the temperature of the chloride to that point at which electrolytic decomposition readily takes place. The pressure exerted by the evolution of chlorine within the vessel under the influence of heat prevents the chloride from volatilizing, while it is maintained in a fused condition and at a much higher temperature than can be attained without pressure. The higher the temperature of the fused chloride the more readily it is decomposed by the electric current. While the best results are obtained from my process by the use of exceedingly high temperatures, yet any rise in temperature above the ordinary volatilizing point of the chloride is advantageous.

An apparatus by which this process may be performed is shown in the drawing.

A is a suitable furnace adapted to receive a vessel B, constructed as before explained. This vessel has an open top located outside of the furnace, which is closed air-tight by a cover C of mica or other suitable material. This cover carries the metal or carbon electrodes D E, provided with circuit connections 1 2, or the vessel itself may form one electrode. F is the substance—such as chloride of aluminium—which it is desired to decompose.

The desired high heat and pressure being obtained by means of the furnace, 1 2 are connected with a source of electrical energy, and the decomposition of the substance F takes place.

If chloride of aluminium is the substance treated, the electrolytic decomposition will cause the metal aluminium to be produced at the cathode, (the electrode at which the current leaves the fused chloride,) about which it collects. When the operation is completed, the vessel is opened and the metal removed, or it may be drawn off by a tap while the operation is in progress.

What I claim is—

1. The process of decomposing substances, consisting in subjecting them to the action of an electric current when under high temperature and pressure, substantially as herein set forth.

2. The process of decomposing substances not readily decomposed at low temperatures, which consists in confining said substances in a suitable vessel, applying heat sufficient to vaporize material in said vessel to produce pressure in the vessel and to raise the temperature of the substance treated above the boiling-point, and finally passing a decomposing-current through the highly-heated substance, substantially as set forth.

This specification signed and witnessed this 19th day of May, 1882.

THOMAS A. EDISON.

Witnesses:
EDW. C. ROWLAND,
C. P. MOTT.